(12) United States Patent
Yamada et al.

(10) Patent No.: US 7,661,698 B2
(45) Date of Patent: Feb. 16, 2010

(54) AIRBAG APPARATUS

(75) Inventors: Satoshi Yamada, Shizuoka (JP);
Kouitirou Uezono, Shizuoka (JP);
Masatoshi Ishigaki, Shizuoka (JP);
Ryuji Sagisaka, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 326 days.

(21) Appl. No.: 11/339,514

(22) Filed: Jan. 26, 2006

(65) Prior Publication Data

US 2006/0181065 A1    Aug. 17, 2006

(30) Foreign Application Priority Data

Jan. 27, 2005    (JP) .............................. 2005-020452

(51) Int. Cl.
*B60R 21/20* (2006.01)
(52) U.S. Cl. .................................................. 280/728.3
(58) Field of Classification Search .............. 280/728.3
See application file for complete search history.

(56) References Cited

U.S. PATENT DOCUMENTS

| 6,076,851 | A |  | 6/2000 | Davis, Jr. et al. |
| 7,093,849 | B2 | * | 8/2006 | Nishijima et al. ........ 280/728.3 |
| 7,178,825 | B2 | * | 2/2007 | Fujii et al. ............... 280/728.3 |
| 2004/0056455 | A1 |  | 3/2004 | Nishijima et al. |

FOREIGN PATENT DOCUMENTS

JP    2004-136698 A    5/2004

* cited by examiner

*Primary Examiner*—Faye M. Fleming
(74) *Attorney, Agent, or Firm*—Sughrue Mion, PLLC

(57) ABSTRACT

An airbag apparatus comprised of a cover for covering an expanding side of an airbag and forming an opening for the airbag. The cover is comprised of a door portion disposed at the expanding side of the airbag, a surrounding portion surrounding the door portion, a tear portion defining the door portion and tearing due to an expansion force of the airbag, an installation portion protruding from the surrounding portion adjacent to the tear portion toward an opposite side of the expanding side, and a hinge portion connecting the door portion and the surrounding portion located outside of the installation portion.

10 Claims, 6 Drawing Sheets

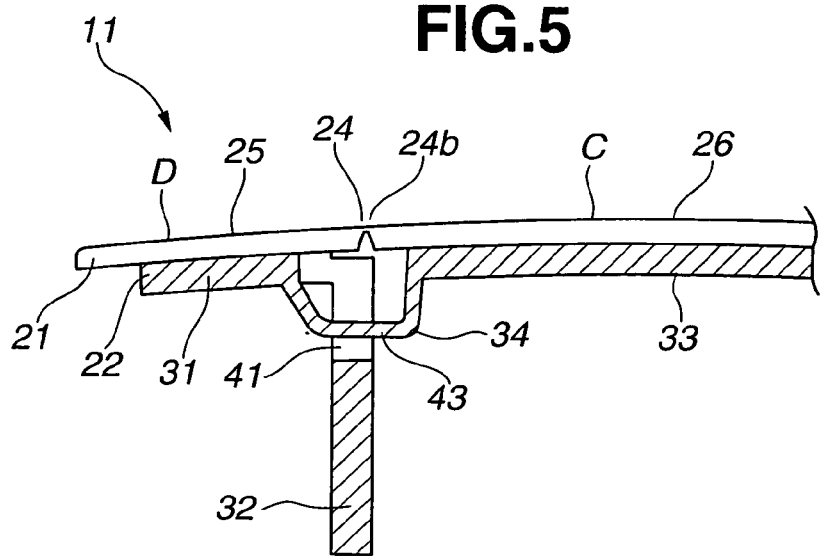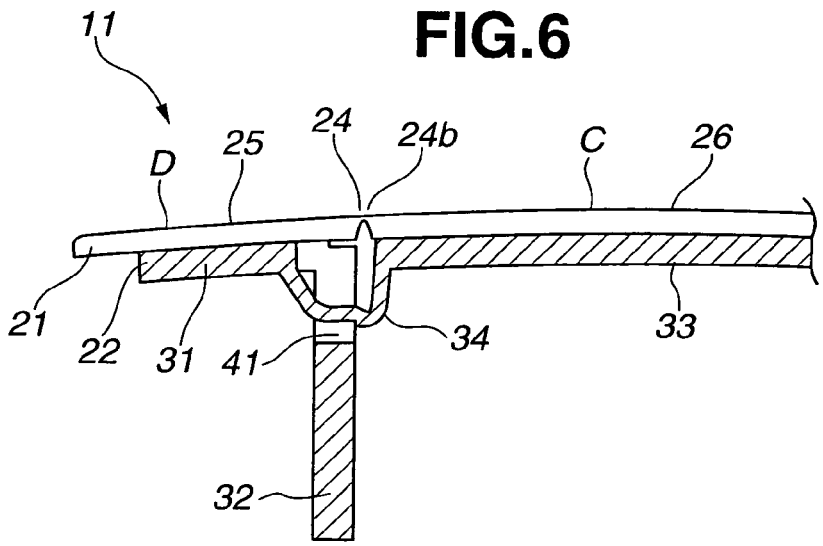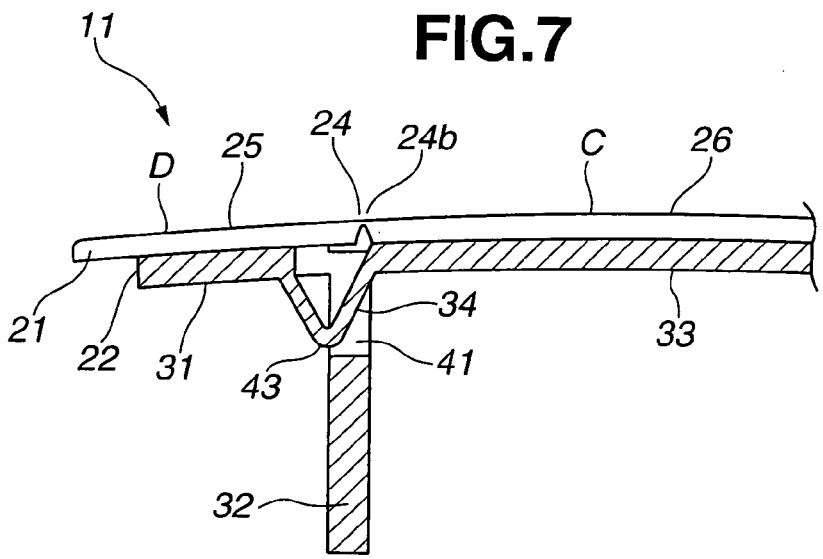

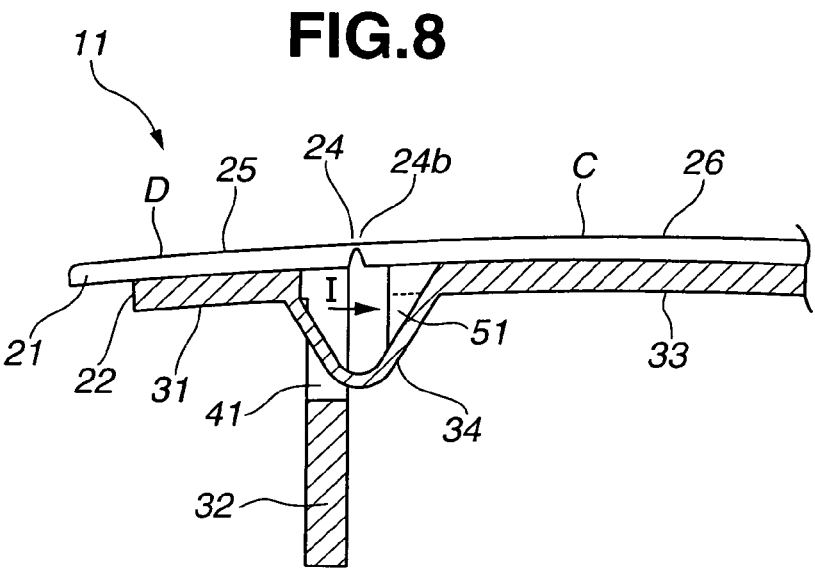
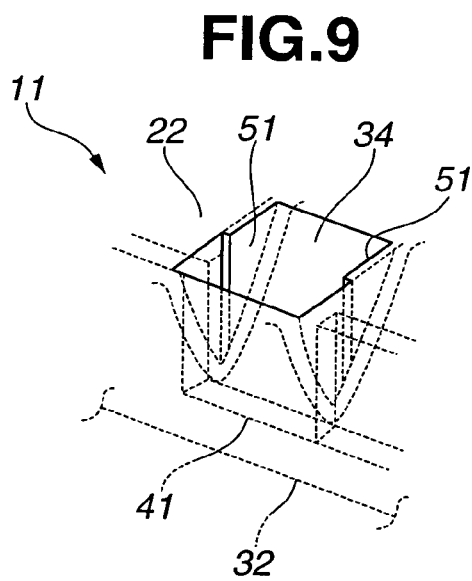
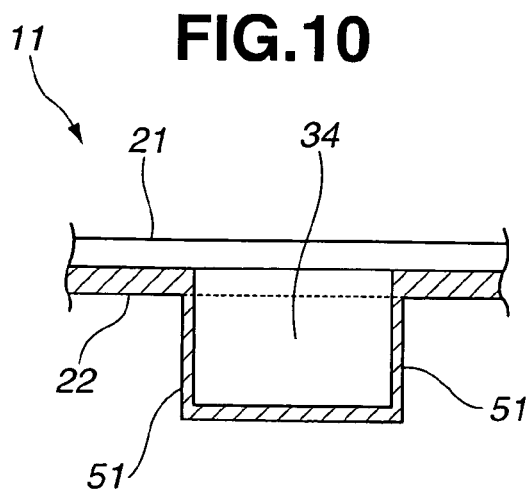

AIRBAG APPARATUS

BACKGROUND OF THE INVENTION

The present invention relates to an airbag apparatus, and particularly to a cover for an airbag apparatus.

An airbag is a popular restraint apparatus for a passenger of a vehicle. One example of such an airbag is an airbag for a front seat passenger. It is commonly known that a passenger-side airbag apparatus for a vehicle is disposed within an instrument panel. Such an airbag apparatus comprises a box-shaped retainer which stores a folded airbag and an inflator for inflating the airbag. An upper opening of the retainer is covered with a cover which is attached to the instrument panel. A C-shaped tear line is formed on the cover so as to define a door portion. Upon collision of a vehicle, gas is injected into the airbag from the inflator. The airbag first expands inside the retainer, and the tear line tears due to the expansion force of the airbag. The door portion opens by turning on an imaginary line connecting both ends of the C-shaped tear line to form an opening for the airbag. The airbag then inflates from the opening into a passenger compartment of the vehicle to absorb shock applied to a passenger.

Further, there is known a seamless instrument panel which improves an appearance of the cover and the instrument panel. Such a seamless instrument panel is formed such that the cover and the instrument panel are integrally formed, an installation member is projectingly formed on a back surface of the instrument panel, and a groove-shaped tear line is formed along the installation member. Japanese Published Patent Application No. 2004-136698 discloses a typical seamless instrument panel which comprises a panel main body made of resin, an installation bracket made of resin, which is welded to the back surface of the panel main body. A tear portion of a closed-loop is formed on the back surface of the panel main body so as to define a door portion. The installation bracket comprises a cylindrical portion welded to an outer peripheral portion of the door portion, a reinforcement plate welded to a back surface of the door portion and a hinge portion connecting the cylindrical portion and the reinforcement plate. The hinge portion is formed into a U-shape in cross section so as to protrude toward the airbag.

SUMMARY OF THE INVENTION

However, this hinge structure limits a storage space of the airbag and functions as a bar to a downsizing of the airbag apparatus. Further, there is a possibility that a top portion of the curved hinge portion is pressed by the airbag during the expansion state and therefore the door portion may exhibit unusual developing behavior. Therefore the disclosed cover structure is further required to stand against the pressure of expanding airbag and to improve the space utility.

It is therefore an object of the present invention to provide an improved airbag apparatus which is capable of easily ensuring a storage space for an airbag and of forming an opening for the expanding airbag as desired upon ensuring the reliability in behavior of a cover easily during the expansion of an airbag.

An aspect of the present invention resides in a cover, which is for an airbag apparatus, covers an expanding side of an airbag and forms an opening through which the airbag expands. The cover comprises: a door portion disposed at the expanding side of the airbag; a surrounding portion surrounding the door portion; a tear portion defining the door portion and the surrounding portion, the tear portion tearing due to an expansion force of the airbag; an installation portion protruding from an inner peripheral portion of the surrounding portion adjacent to the tear portion toward an opposite side to the expanding side; and a hinge portion connecting the door portion and a portion of the surrounding portion which is located outside of the installation portion relative to the door portion.

Another aspect of the present invention resides in a cover, which is for an airbag apparatus, covers an expanding side of an airbag and forms an opening through which the airbag expands. The cover comprises: a door portion; a surrounding portion surrounding the door portion; a tear portion connecting the door portion and the surrounding portion, the tear portion having a thickness, which is thinner than each of thicknesses of the door portion and the surrounding portion; an installation portion protruding from an portion of the surrounding portion adjacent to the tear portion toward an opposite direction toward the expanding direction; and a hinge portion connecting an outer peripheral portion of the door portion and an inter peripheral of the surrounding portion through an opening formed between the surrounding portion and the installation portion, the hinge portion protruding in the opposite direction.

A further aspect of the present invention resides in an airbag apparatus which comprises: an airbag; an inflator supplying gas into the airbag; a case body storing the airbag and the inflator; and a cover covering the case body and forming an opening through which the airbag expands. The cover comprises, a door portion disposed at the expanding side of the airbag, a surrounding portion surrounding the door portion, a tear portion defining the door portion and the surrounding portion, the tear portion tearing due to an expansion force of the airbag, an installation portion protruding from an inner peripheral portion of the surrounding portion adjacent to the tear portion toward an opposite side to the expanding side, and a hinge portion connecting the door portion and a portion of the surrounding portion which is located outside of the installation portion relative to the door portion.

The other objects and features of this invention will become understood from the following description with reference to the accompanying drawings.

BRIEF DESCRIPTION OF THE DRAWINGS

FIG. 5 is a cross sectional view showing a modification of the cover according to the present invention.

FIG. 6 is a cross sectional view showing another modification of the cover according to the present invention.

FIG. 7 is a cross sectional view showing another modification of the cover according to the present invention.

FIG. 8 is a cross sectional view showing another modification of the cover according to the present invention.

FIG. 9 is a perspective view partially and schematically showing the cover of FIG. 8.

FIG. 10 is a view of a part of the cover taken in the direction of the arrow I in FIG. 9.

DETAILED DESCRIPTION OF THE INVENTION

There is discussed an embodiment of an airbag apparatus and a cover for the airbag apparatus in accordance with the present invention, with reference to the drawings.

Figure 1:
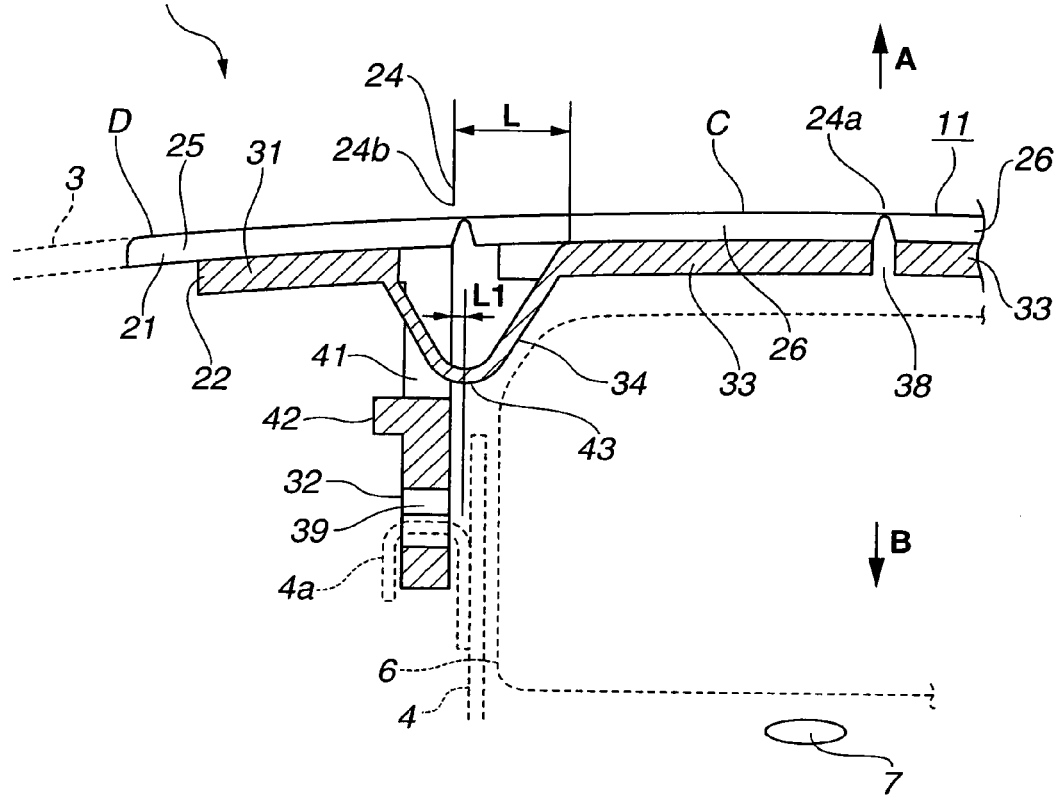
FIG. 1 is a cross sectional view partially showing a cover of an airbag apparatus according to an embodiment of the present invention.

As shown in FIG. 1, an airbag apparatus 1 according to the embodiment of the present invention is provided within an instrument panel portion 3 of a vehicle and functions as a passenger side airbag apparatus. Instrument panel portion 3 is disposed below a front window and extends in the lateral direction of the vehicle at a front portion in a passenger compartment of the vehicle. Airbag apparatus 1 comprises a case body 4 which is an installed member referred as a retainer, an inflator 7 which is contained in a reaction canister formed at a lower portion of case body 4, an airbag 6 which is folded and stored inside of an upper portion of case body 4 and a cover 11 which covers an opening portion formed at an upper end of case body 4. Airbag apparatus 1 is installed in a vehicle body by fixing the reaction canister of case body 4 to reinforcement members of the vehicle body through brackets. A mid retainer, which has a gas jetting port for communicating upper and lower portions, is disposed between the upper portion of case body 4 and the reaction canister to partition case body 4. Further, C-shaped hooks 4a are installed at upper-front and upper-rear portions of case body 4 and function as installation portions. Inflator 7 may be any of a combustion type (pyrotechnic-type) and a stored type of storing compression gas.

When the vehicle provided with the airbag apparatus 1 collides with other vehicle or object, gas is injected from inflator 7 into airbag 6 which then expands. Due to this expanding pressure of airbag 6, cover 11 is torn and forms an expansion port. Airbag 6 then expands in an upward direction A in FIG. 1 and is developed toward a vehicle passenger. Hereinafter, as shown in FIG. 1, the upward direction A is employed as the predetermined direction of an expansion side of airbag 6, and a downward direction B is employed as an inverse direction of the expansion direction and a back surface side. Further, fore-and-aft directions and lateral directions of airbag apparatus 1 installed in the vehicle are treated as the fore-and-aft directions and the lateral directions, respectively. The installation state of airbag 1 is not limited to the above discussed state and may be set such that the expansion direction is a rearward and upward direction or rearward direction.

Figure 2:
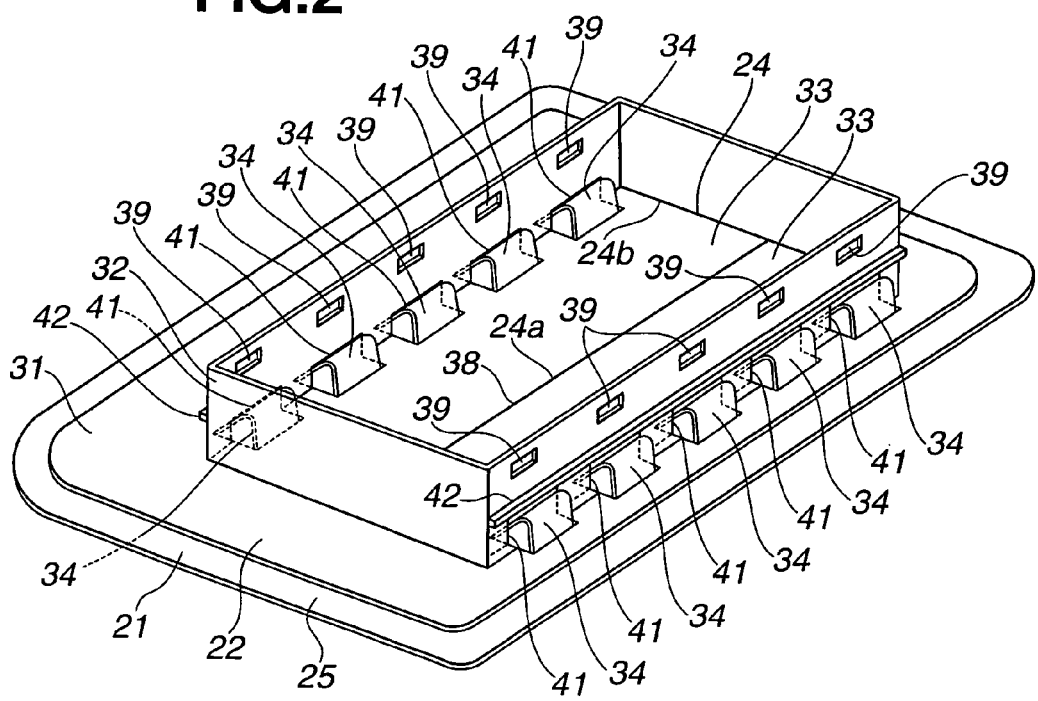
FIG. 2 is a perspective view of the cover.
Figure 3:
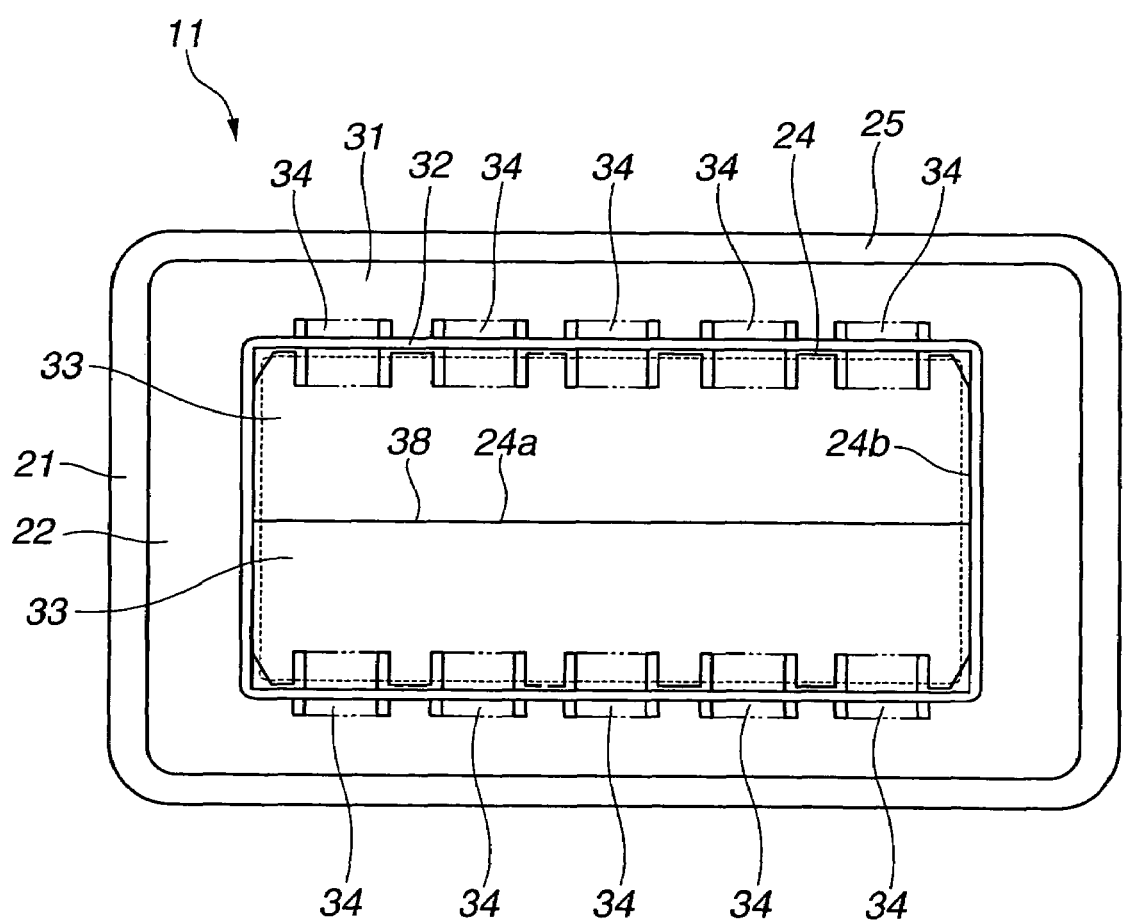
FIG. 3 is a bottom view of the cover.

As shown in FIGS. 1 through 3, cover 11 comprises an outer member 21 constructing the instrument panel and an inner member 22 connected to the back side of outer member 21 by means of vibration welding. That is, cover 11 is a seamless lid or seamless instrument panel formed integrally with instrument pane portion 3.

Outer member 21 is referred as an outer, an outer skin panel, outer panel portion, panel body, or lid outer. Outer member 21 integrally covers an outer surface side of instrument panel portion 3 and is exposed. That is, outer member 21 of a plate shape is disposed at a front portion in the passenger compartment to extend along the vehicle lateral direction. Outer member 21 is a molded element made of thermoplastic resin, for example, an injection molding of polypropylene resin. Rigid resin is preferable for outer member 21. In stead of polypropylene resin, Polyvinyl chloride, ABS resin, m-PPO (styrene-modified polyphenylene oxide), polycarbonate or composite resin, which is combination of the discussed resins, may be employed. As concrete composite resin, composite resin of polycarbonate and ABS resin may be used. Further, as composite technique applicable to resin used in the above-discussed technical field, additive, such as talc, whisker, and titanium white may be used for controlling physical properties and color. An outer surface of outer member 21 is processed by matt grain finish to ensure preferable appearance.

The back side of outer member 21 faces with the opening portion of the upper portion of case body 4. A tear line 24 is formed on the back side of outer member 21 so as to generally face with the opening of the upper portion of case body 4, and functions as a tear portion which is a weak portion. Tear line 24 defines an outer surrounding portion 25 functioning as non-developed portion and a pair of front and rear outer-door portions 26 and 26 which are surrounded by outer surrounding portion 25. Outer-door portions 26 and 26 covers the expansion side of airbag 6 which has been folded and stored in case body 4. Tear line 24 is a tearable weak portion which may be referred as a tear, tear groove, rupture planned portion, breaking planned groove or braking point. In the embodiment according to the present invention, tear line 24 comprises a center tear line 24a laterally and straightly extending on the center portion of instrument panel portion 3 and a surrounding tear line 24b of a rectangular shape. That is, tear line 24 defines two adjacent rectangles which are separated when airbag 6 is inflated. Center tear line 24a is smaller in thickness than surrounding tear line 24b so as to easily and quickly tear as compared with surrounding tear line 24b. Although tear line 24 is normally a cutout groove which is formed on a flat molded portion by machining with a rotary blade such as a milling cutter after outer member 21 has been molded, it may be directly molded during the injection molding of outer member 21.

On the other hand, inner member 22 is commonly referred as an inner, backing, backing member or lid inner. Inner member 22 is made of soft resin which is softer than material of outer member 21 and has a plane shape which is greater than the sum of outer door portions 26 and 26. Inner member 22 is disposed at portions corresponding to inside and outside of tear line 24 and is joined to outer member 21 by welding. That is, a door portion is formed by joining the inner member 22 to the back surface of outer door portions 26 and 26, and a surrounding portion D is formed by joining the inner member 22 to outer surrounding portion 25. Inner member 22 is an injection molding made of elastomer resin, for example, TPO (thermoplastic olefin) resin known as a trade name of Sumitomo TPE produced by Sumitomo Chemical Co., Ltd. Various soft elastomer such as TPU (urethane), TPE (polyester), SES, and SEBS (styrene) may be used as material of inner member 22.

Inner member 22 comprises an inner surrounding portion 31, an installation portion 32, inner door portions 33 and 33, and a plurality of hinge portions 33, which are integrally connected. Inner surrounding portion 31 is a rectangular frame and is fixedly connected to the back surface of outer surrounding portion 25 of outer member 21. Installation portion 32 is of a rectangular cylindrical shape and extends from an end portion of an inner peripheral portion of inner surrounding portion 31. Rectangular inner door portions 33 and 33 are disposed at the inner peripheral side of inner surrounding portion 31 and are fixed to the back sides of outer door portions 26 and 26, respectively. Hinge portions 34 connect inner door portions 33 and 33 to inner surrounding portion 31. Inner member 22 further comprises a separation portion 38 which is formed between outer door portions 26 and 26 and along both sides of outer door portions 26 and 26, that is, at positions corresponding to short sides of surrounding tear line 24b and corresponding to center tear line 24a, so as to form a narrow groove or a channel-shaped groove into H-shape on a plane of inner member 22.

Each inner door portion 33 of inner member 22 is formed between a position along center tear line 24a and a position slightly apart from installation portion 32 inwardly, as shown in FIG. 3, and therefore inner door portion 33 is slightly smaller in area than door portion 26 of outer member 21.

A plurality of welding ribs (not shown) are formed on an upper surfaces (connecting surfaces) of inner surrounding portion 31 and inner door portions 33 and 33. These ribs are melt by vibration welding using a vibration welding machine, and therefore inner surrounding portion 31 is welded to outer surrounding portion 25, and inner door portions 33 and 33 are welded to outer door portions 26 and 26, respectively.

Installation portion 32 may be referred as a standing wall or retainer installation wall. In this embodiment according to the present invention, installation portion 32 is formed into a rectangular cylinder so as to be located almost directly blow the surrounding tear line 24b of outer member 21, that is, the inner surface of installation portion 32 is located along the position of surrounding tear line 24b. A plurality of installation holes 39 of rectangular holes are formed at fore-and-aft surfaces (longitudinal side) of installation portion 32 and function as installation portions. Hooks 4a of case body 4 are fixed to installation holes 39 to connect the cover 11 and the case body 4. A plurality of rectangular opening portions 41 are formed at the fore-and-aft surface portions of installation portion 32. Each opening portion 41 is located at a portion above each installation hole 39 in the upward direction A with a predetermined distance therebetween. Each opening portion 41 is further extended into inner surrounding portion 31 by cutting out a corresponding part of inner surrounding portion 31. Further, reinforcement bead portions 42 are integrally formed at the fore-and-aft surface portions of installation portion 32, respectively. Each reinforcement portion 42 is located between installation holes 39 and opening portions 41 and protrudes from installation portion 32 outwardly. Each bead portion 42 extends along the end portion of below opening portions 41 throughout the longitudinal length.

Each hinge portion 34 is deformable and crosses tear line 24. More specifically, front hinge portions 34 straddle the front tear line 24b, and rear hinge portions 34 straddle the rear tear line 24b along a portion facing with the fore-and-aft tear lines 24. Hinge portions are arranged at predetermined intervals along the tear line 24. Each hinge portion 34 resiliently connects inner surrounding portion 31 and inner door portions 33 and 33 through each opening portion 41. An end of each hinge portion 34 is connected to an edge portion of inner door portion 33, and the other end of each hinge portion 34 is connected to an edge portion of inner surrounding portion 31. A curved portion of each hinge portion 34 protrudes in the downward direction B in which the folded airbag is stored. More specifically, each hinge portion has a curved portion which has a U-shaped cross section protruding in the downward direction B.

A lower and center portion of hinge portion 34, which is located at almost center in the fore-and-aft direction, is a top portion 43 and faces with the downward direction B of tear line 24. More specifically, top portion 43 of hinge portion 34, tear line 24 and the inner surface of installation portion 32 are located almost on the same plane. It is preferable that a distance L1 between top portion 43 of hinge portion 34 and the inner surface of installation portion 32 (an end of opening portion 41) is as short as possible, and 0 is most preferable.

Subsequently, there is discussed the development behavior of cover 11 in case that airbag apparatus 1 works.

Figure 4A:
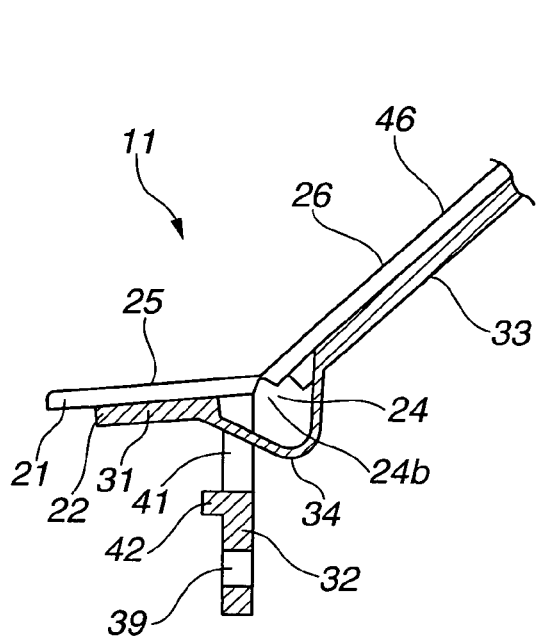
FIGS. 4A, 4B, 4C and 4D are explanatory views explaining development process of a door portion of the cover.

Gas is first injected into airbag 6, and expansion of airbag 6 starts. Airbag 6 expands in case body 4, and due to the expansion force of airbag 6, outer door portions 26 and 26 of outer member 21 are pushed upwardly through inner door portion 33 and 33 of inner member 22. Due to this force, center tear line 24a firstly tears, and whole tear line 24 of outer member 21 then tears. Therefore, outer door portions 26 and 26 are separated from other part of outer member 21. Otherwise, center tear line 24a and surrounding tear line 24b along the lateral sides of the installation portion 32 tears. Then, outer door portions 26 and 26 develop and open as door portions 46 so as to lift up the center portion of cover 11, as shown in FIG. 4A.

Subsequently, each door portion 46 smoothly turns on a portion of tear line 24 while stretching the curved portion of each hinge portion 34. That is, each door portion 46 moves continuously from a state of FIG. 4A through states of FIGS. 4B and 4C to a development achieved state of FIG. 4D, and an expanding opening of airbag 6 is formed.

With the thus arranged embodiment according to the present invention, since opening portions 41 are provided at installation portion 32 to function as an escape area of hinge portions 34 and each hinge portion 34 connects inner surrounding portion 31 and inner door portion 33 through opening portion, it becomes possible to locate top portions 43 of the respective hinge portions 34 along the inner peripheral surface of installation portion facing with tear line 24 while ensuring the longitudinal dimension of hinge portion 34 and offsetting each hinge portion 34 outwardly, as compared with a hinge portion arranged to connect an installation portion and an inner door portion.

By decreasing a dimension L indicative of a projecting quantity of each hinge portion 34 toward the door portion side C, a welded area between outer door portion 26 and inner door portion 33 increases. This increase easily strengthens the fixing between outer door portion 26 and inner door portion 33 which radically develop during the expansion of airbag 6, and increases a storing space of airbag 6. Accordingly it becomes possible to downsize the airbag apparatus 1 or to store a large-sized-airbag 6. For example, it becomes possible to decrease the dimension L shown in FIG. 1 by half as compared with a construction that hinge portions connect an installation portion and an inner door portion.

Since top portions 43, which are center portions of the respective hinge portions 34, are arranged along the inner peripheral surface of installation portion 32 while facing with tear line 24, it is possible to decease the distance L1 shown in FIG. 1 and to preferably set the distance L1 at 0. This arrangement of hinge portions 34 suppresses hinge portions 34 from contacting with expanding airbag 6 and from being pushed upwardly by the expanding airbag 6. Consequently, it becomes possible to smoothly turn door portions 46 as desired. More specifically, if hinge portions are pressed by expanding airbag 6 due to the conventional arrangement of hinge portions, there is a possibility that under an extremely severe temperature condition a peripheral portion of door portion 46 slides on outer surrounding portion 25 as shown by two-dot and dash line in FIG. 4C. In contrast, with the embodiment according to the present invention, since hinge portions 34 are arranged such that the center portion of each hinge portion 34 are located directly below tear line 24, it becomes possible to suppress hinge portions 34 from being pushed upward by expanding airbag 6 and to smoothly turn door portions 46 as desired.

With the embodiment according to the present invention, bead portions 42 are formed on installation portion 32 along opening portions 42. This arrangement suppresses stress concentration around opening portions 42 during the expansion of airbag 6 and ensures strength of installation portion 32. Although the embodiment according to the present invention has been shown and described such that each bead portions 42 is disposed throughout the longitudinal length of installation portion 32, bead portions 42 may be formed only at portions facing with opening portions 41.

Since hinge portion 34 of the embodiment according to the present invention is formed into a U-shape, it becomes possible to stably and smoothly open the door portions 46 in a wide temperature range even if an extensibility of the employed resin decreases under a low temperature condition.

Since cover 11 is formed by connecting outer member 21 and inner member 22, which have been molded using resins, respectively, it is easy to integrally construct cover 11 with an instrument panel. Further, as compared with a metal cover whose linear expansibility is largely different from that of resin for the instrument panel, cover 11 according to the embodiment of the present invention performs a preferable appearance having resistance to thermal deformation in a wide temperature range. Further, cover 11 has a simple structure which suppresses the production cost thereof.

With the embodiment according to the present invention, it becomes possible to provide a suitable construction of cover 11 of airbag apparatus 1 for a vehicle and particularly to provide a suitable construction of cover 11 of airbag apparatus 1 for a front seat passenger, which is integrally constructed with an instrument panel.

Although the embodiment according to the present invention has been shown and described such that each hinge portion 34 is formed into a U-shape and top portion 43 of each hinge portion 34 faces with tear line 24, the invention is not limited to this and may be arranged such that each hinge portion 34 is formed into a channel shape by properly arranging a molding die for inner member 22, as shown in FIG. 5. The modification shown in FIG. 5 is arranged such that at a position along the upper end portion of installation portion 32, inner surrounding portion 31 is not in contact with outer surrounding portion 25, and that tear line 24 is formed at a position facing with the upper end portion of installation portion 32. That is, the distance L1 is set at 0 in this modification shown in FIG. 5.

Further, hinge portions 34 may be modified such that a hinge start point at a hinge end portion connected to inner door portion 33 is brought closer to tear line 24 as possible, as shown in FIG. 6. That is, by locating the hinge end portion of each hinge portion 34 at a position along tear line 24, it becomes possible to minimize the projection of each hinge portion 34 toward airbag 6. This modified arrangement suppresses an interference of the expanding airbag 6 in hinge portions 34 and maximizes the storage space of airbag 6.

Further, hinge portions 34 may be modified such that top portion 43 of each hinge portion 34 is located outside of installation portion 32 such that the hinge end portion is brought closer to tear line 24 as possible, top portion 43 of each hinge portion 34 located almost on an outer surface of installation portion 32, as shown in FIG. 7.

Figure 4C:
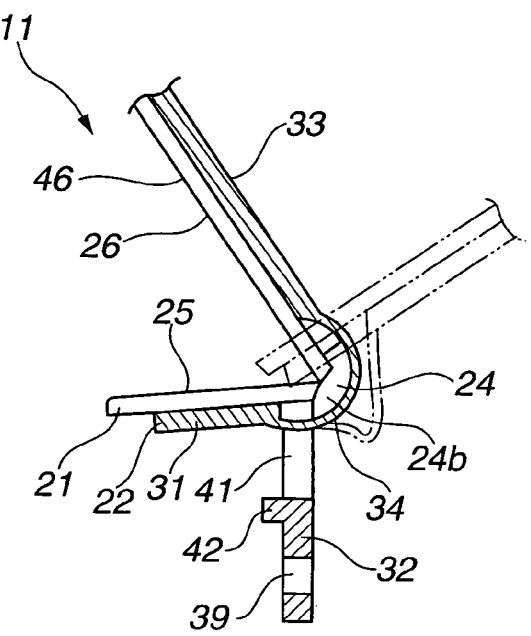
Figure 4B:
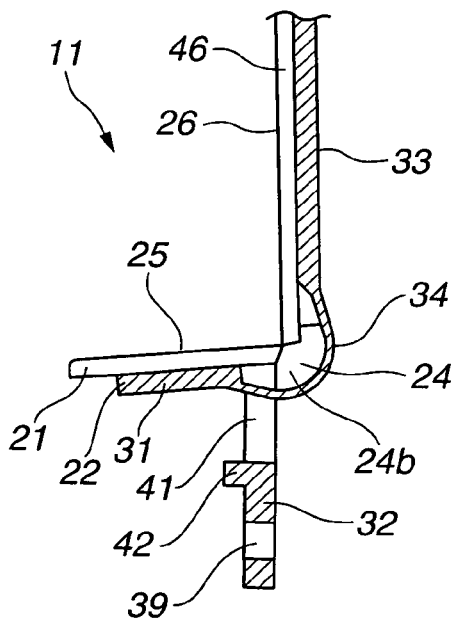
Figure 4D:
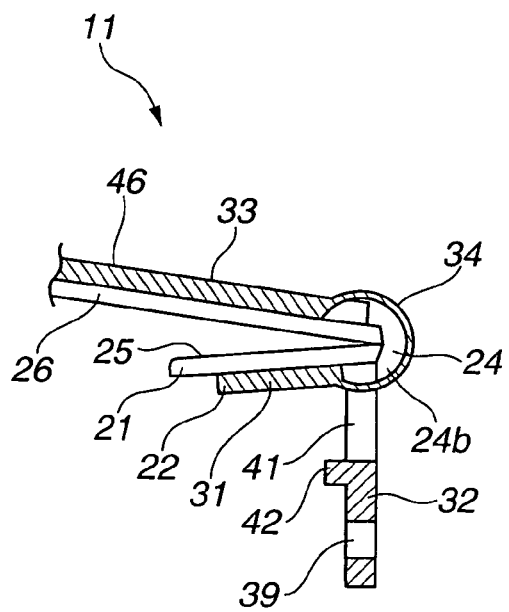

The embodiment and the modifications according to the present invention may be further arranged such that there is provided a deformation suppressing portion for suppressing a deformation of hinge portion 34 during an initial expansion state of airbag 6 at each hinge portion 34, in order to prevent a behavior that the end portion of door portion 46 rides on outer surrounding portion 25 as shown by two-dot and dash lines in FIG. 4C and to certainly execute the behavior that door portion 46 turns in the vicinity of hinge portions 34 as shown by continuous lines in FIG. 4C.

For example, as shown in FIGS. 8 through 10, a pair of rib portions 51 are formed at both lateral sides of each hinge portion 34 near inner door portion 33. Each rib portion 51 connects a part of the curved portion of each hinge portion 34 with inner door portion 33. This modification enables the smooth development of door portions 46. Each rib portion 51 of a plate type is very thin. For example, the thickness of each rib portion 51 ranges from 0.3 mm to 0.1 mm. Each rib portion 51 formed from the hinge start end of inner door portion 33 to the neighborhood of tear line 24. By this arrangement, the pair of rib portions 51 suppress the deformation of each hinge portion 34 during an initial expansion state of airbag 6 and promote the turn of door portion 46. Consequently, door portion 46 smoothly turns on a portion near tear line 24.

Figure 11:
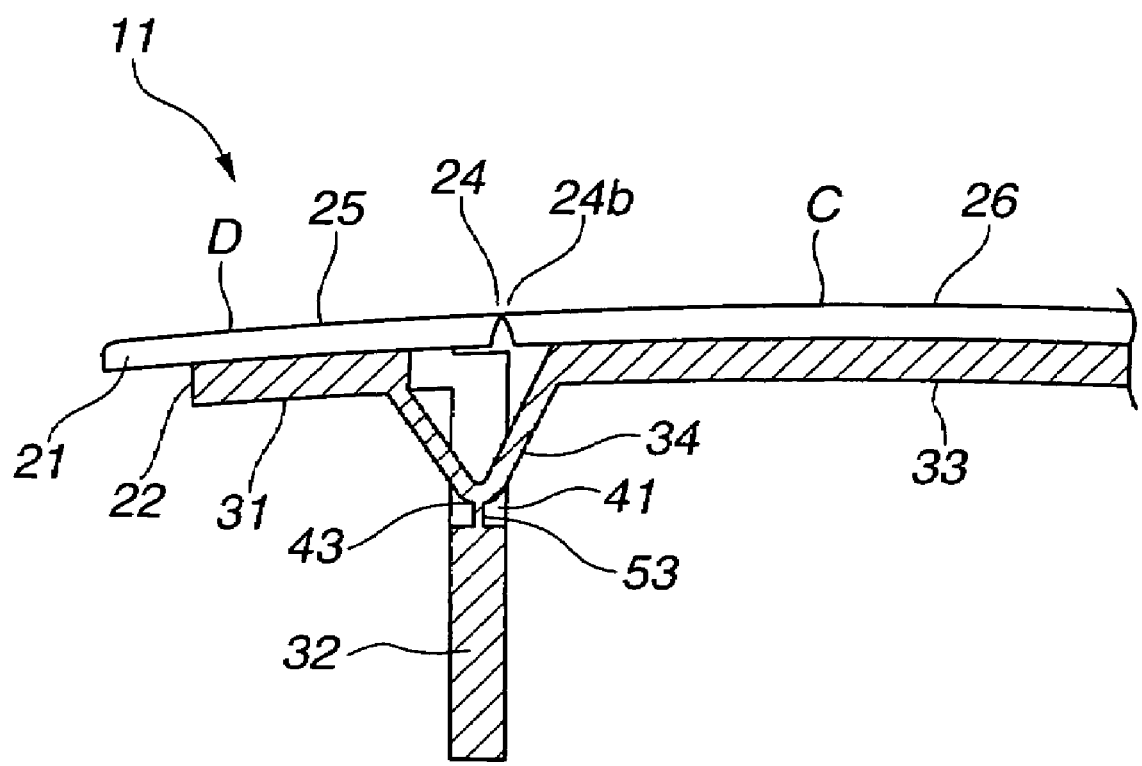
FIG. 11 is a cross sectional view showing another modification of the cover according to the present invention.

Further, as shown in FIG. 11, a tearable rib portion 53 may be formed so as to connect top portion 43 of each hinge portion 34 and installation portion 32 directly below the top portion 34, as a deformation suppressing portion. This arrangement of rib portion 53 suppresses the deformation of each hinge portion 34 during an initial state of the expansion of airbag 6 and generates the turn of door portion 46. Then, each rib portion 53 is torn from installation portion 32 at a predetermined time during the expanding state to smoothly open and turn door portion 46.

Further, installation portion 32 may be formed along the position corresponding to the inner periphery of surrounding tear line 24b, and may be formed along the position near the outer periphery of surrounding tear line 24b.

Although the embodiment and the modifications according to the present invention have been shown and described such that a pair of the front and rear door portions 26 and 26 are provided and open from the center therebetween (double-flap door structure), the invention is not limited to this arrangement and may be arranged such that one door portion defined by a rectangular tear line is provided and opens from a front side of the single door (single-flap door structure).

Although the embodiment and the modification according to the present invention have been shown and described such that cover 11 of airbag apparatus 1 is for a front seat passenger and installed in the instrument panel portion 3, the invention may be adapted to a cover for an airbag apparatus which is disposed at other position as an interior panel of a vehicle.

A cross-sectional shape of tear line 24 functioning as a tear starting portion may be formed into other preferable shape instead of a triangular shape of the embodiment according to the present invention. For example, the cross-sectional shape of tear line 24 may be formed into a trapezoidal shape.

Although the embodiment according to the present invention has been shown and described such that cover 11 is integrally formed with instrument panel portion 3, the invention is not limited to this and may be formed as a separate cover which is set in an opening portion of instrument panel portion 3.

Further, although the embodiment according to the present invention has been shown and described such that cover 11 is formed by joining the separately molded outer member 21 and inner member 22, the invention is not limited to this structure, and cover 11 may be formed by integrally molding outer member 21 and inner member 22.

With the arrangement according to the present invention, when airbag 6 expands, tear line 24 tears due to the pressure of the expanding airbag 6. Then outer door portion 26 is separated from outer surrounding portion 25 to form door portion 46, and therefore the opening of the expanding airbag 6 is formed. Door portion 46 is connected to inner surrounding portion 31 through hinge portions 34 and turns around hinge portions 34 acting as a fulcrum. Since hinge portions 34 protrudes toward the direction opposite to the expansion direction, door portion 46 easily and smoothly turns under the low temperature condition. Further, since hinge portions 34 are disposed outside of installation portion 32 and connected to inner surrounding portion 32, a dimension of each hinge portion 34 is ensured, and hinge portions 34 are suppressed from protruding toward airbag 6. Therefore, this arrangement gains advantages of easily ensuring the storage space of airbag 6, of suppressing influence of the expanding airbag 6 to hinge portions 34. This suppression of the influence enables door portion to develop according to a desired behavior to easily form the opening for expanding airbag 6 toward a vehicle passenger as desired, and thereby ensuring the smooth development of airbag 6.

Further, with the arrangement according to the present invention, since inner member 22 having hinge portions 34 and outer member 21 having tear line 24 are separately produced, outer member 21 may not have a flexibility and may be molded using rigid resin. This allows outer member to be integrally molded with a member except for members of airbag apparatus and enables the appearance of airbag apparatus to be easily improved. Further, since hinge portions 34 are disposed outside of installation portion 32 and connected to inner surrounding portion 32, a connecting area between inner door portion 33 and outer door portion 26 is sufficiently ensured. This easily improves the connection strength between inner door portion 33 and outer door portion 26 and the connection strength between inner surrounding portion 31 and door portion 46.

This application is based on Japanese Patent Application No. 2005-20452 filed on Jan. 27, 2005 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A cover for an airbag apparatus, the cover covering an expanding side of an airbag and forming an opening through which the airbag expands, the cover comprising:
    a door portion disposed at the expanding side of the airbag;
    a surrounding portion surrounding the door portion;
    a tear portion defining the door portion and the surrounding portion, the tear portion tearing due to an expansion force of the airbag;
    an installation portion protruding from an inner peripheral portion of the surrounding portion adjacent to the tear portion toward an opposite side to the expanding side; and
    a hinge portion connecting the door portion and a portion of the surrounding portion which is located outside of the installation portion relative to the door portion,
    wherein the installation portion has an opening through which the hinge portion connects the door portion and the surrounding portion.

2. The cover as claimed in claim 1, further comprising,
    an outer member which comprises an outer door portion constructing the door portion, an outer surrounding portion constructing the surrounding portion and the tear portion having a loop shape of partitioning the door portion from the outer surrounding portion, and
    an inner member which comprises an inner door portion joined to the outer door portion, an inner surrounding portion joined to the outer surrounding portion, the installation portion protruding from the inner surrounding portion, and the hinge portion connecting the inner door portion and the inner surrounding portion.

3. The cover as claimed in claim 1, wherein a center portion of the hinge portion faces with the tear portion and is separated from the tear portion in the opposite direction.

4. The cover as claimed in claim 1, where the installation portion comprises a bead portion formed in the vicinity of the opening.

5. The cover as claimed in claim 1, further comprising a pair of rib portions which are formed at both lateral sides of the hinge portion near the door portion, each rib portion connecting a part of a curved portion of the hinge portion and the door portion.

6. The cover as claimed in claim 1, further comprising a tearable rib portion which are formed so as to connect a top portion of the hinge portion and the installation portion directly below the top portion.

7. The cover as claimed in claim 1, wherein the hinge portion includes a plurality of hinge portions which are arranged at predetermined intervals along the tear line defining a side of the door portion.

8. A cover for an airbag apparatus, the cover covering an expanding direction of an airbag and forming an opening through which the airbag expands, the cover comprising:
    a door portion;
    a surrounding portion surrounding the door portion;
    a tear portion connecting the door portion and the surrounding portion, the tear portion having a thickness, which is thinner than each of thicknesses of the door portion and the surrounding portion;
    an installation portion protruding from an portion of the surrounding portion adjacent to the tear portion toward an opposite direction toward the expanding direction; and
    a hinge portion connecting an outer peripheral portion of the door portion and an inter peripheral of the surrounding portion through an opening formed between the surrounding portion and the installation portion, the hinge portion protruding in the opposite direction.

9. A cover for an airbag apparatus, the cover covering an expanding side of an airbag and forming an opening through which the airbag expands, the cover comprising:
    a door portion disposed at the expanding side of the airbag;
    a surrounding portion surrounding the door portion;
    a tear portion defining the door portion and the surrounding portion, the tear portion tearing due to an expansion force of the airbag;
    an installation portion protruding from the inner peripheral portion of the surrounding portion adjacent to the tear portion toward an opposite side to the expanding side;
    a hinge portion connecting the door portion and a portion of the surrounding portion which is located outside of the installation portion relative to the door portion; and
    a tearable rib portion which are formed so as to connect a top portion of the hinge portion and the installation portion directly below the top portion.

10. A cover for an airbag apparatus, the cover covering an expanding side of an airbag and forming an opening through which the airbag expands, the cover comprising:
    a door portion disposed at the expanding side of the airbag;
    a surrounding portion surrounding the door portion;
    a tear portion defining the door portion and the surrounding portion, the tear portion tearing due to an expansion force of the airbag;

an installation portion protruding from an inner peripheral portion of the surrounding portion adjacent to the tear portion toward an opposite side to the expanding side; and a hinge portion connecting the door portion and a portion of the surrounding portion which is located outside of the installation portion relative to the door portion, wherein the hinge portion includes a plurality of hinge portions which are arranged at predetermined intervals along the tear line defining a side of the door portion.

* * * * *